US011873605B2

(12) United States Patent
Luo et al.

(10) Patent No.: US 11,873,605 B2
(45) Date of Patent: Jan. 16, 2024

(54) LIQUID-STATE TEMPORARY REINFORCING MATERIAL, PREPARATION METHOD THEREFOR AND APPLICATION THEREOF

(71) Applicant: SHANGHAI UNIVERSITY, Shanghai (CN)

(72) Inventors: Hongjie Luo, Shanghai (CN); Xiao Huang, Shanghai (CN); Yarong Yu, Shanghai (CN); Xiangna Han, Shanghai (CN); Bo Rong, Shanghai (CN); Qinghua Ren, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 973 days.

(21) Appl. No.: 16/648,804

(22) PCT Filed: Jun. 15, 2018

(86) PCT No.: PCT/CN2018/091519
§ 371 (c)(1),
(2) Date: Mar. 19, 2020

(87) PCT Pub. No.: WO2019/062216
PCT Pub. Date: Apr. 4, 2019

(65) Prior Publication Data
US 2020/0217009 A1     Jul. 9, 2020

(30) Foreign Application Priority Data
Sep. 29, 2017  (CN) .......................... 201710912079.9

(51) Int. Cl.
| | | |
|---|---|---|
| D06M 13/144 | (2006.01) | |
| D06M 13/165 | (2006.01) | |
| D06M 13/53 | (2006.01) | |
| B27K 3/12 | (2006.01) | |
| C04B 41/46 | (2006.01) | |
| C04B 41/82 | (2006.01) | |
| C04B 41/00 | (2006.01) | |
| B27K 3/50 | (2006.01) | |
| D06M 15/53 | (2006.01) | |
| D21H 25/18 | (2006.01) | |
| D06M 101/06 | (2006.01) | |

(52) U.S. Cl.
CPC ............. *D06M 13/144* (2013.01); *B27K 3/12* (2013.01); *B27K 3/50* (2013.01); *C04B 41/009* (2013.01); *C04B 41/46* (2013.01); *C04B 41/82* (2013.01); *D06M 13/165* (2013.01); *D06M 15/53* (2013.01); *D21H 25/18* (2013.01); *D06M 2101/06* (2013.01)

(58) Field of Classification Search
CPC .. D06M 13/144; D06M 13/165; D06M 15/53; B27K 3/12; B27K 3/50; C04B 41/46; C04B 41/82
See application file for complete search history.

(56) References Cited

U.S. PATENT DOCUMENTS

2004/0018954 A1   1/2004   Su et al.
2017/0157119 A1   6/2017   Zerbe et al.

FOREIGN PATENT DOCUMENTS

| CN | 1394591 A | 2/2003 |
|---|---|---|
| CN | 101962911 A | 2/2011 |
| CN | 103273796 A | 9/2013 |
| CN | 104631105 A | 5/2015 |

*Primary Examiner* — Sikarl A Witherspoon
(74) *Attorney, Agent, or Firm* — Alleman Hall Creasman & Tuttle LLP

(57) ABSTRACT

The present invention relates to a liquid-state temporary reinforcing material, a preparation method therefor and an application thereof. The liquid-state temporary reinforcing material comprises a reinforcing material and a crystallization inhibitor; the reinforcing material is selected from molecules of any two or more of menthol, menthone, menthol ester and menthol ether, and the content of the crystallization inhibitor is less than 50 ppm. For the liquid-state temporary reinforcing material of the present invention, the menthol and the derivatives of the liquid-state temporary reinforcing material are integrally mixed together to form the composite material for temporary reinforcing, the composite material being liquid and volatilization-controllable at room temperature. Thus, the temporary reinforcing requirements for extracting cultural relics at an archaeology excavation site may be met, and the material is convenient to use.

10 Claims, 1 Drawing Sheet

LIQUID-STATE TEMPORARY REINFORCING MATERIAL, PREPARATION METHOD THEREFOR AND APPLICATION THEREOF

TECHNICAL FIELD

The present application belongs to the technical field of conservation of cultural relics at archaeological sites, and specifically relates to preparation of novel temporary reinforcement materials which are liquids at ambient conditions and their applications to temporary reinforcement of fragile cultural relics or remains at archaeological excavation sites.

BACKGROUND

Archaeologists often encounter very fragile cultural relics or remains at archaeological excavation sites, such as fragments of colored drawing lacquerwares, shedding colored drawings, decayed wooden remains, fragile fossils, vulnerable tomb murals, broken pottery, etc. If these cultural relics are not protected immediately at excavation sites, and safely extracted and relocated, these precious remains and relics will be destroyed in a very short period of time, and the precious historical and cultural information they carry would no longer exist, which will inevitably cause immeasurable losses. Cultural relics and remains have been kept underground for hundreds or thousands of years, and many of them have become very fragile. Most remains are found with very loose structures when they are unearthed, and the surrounding soil cannot support the integrity of their existing structures or locations. It is highly likely that they would be damaged again to varying degrees during the period from their excavation to transfer to a laboratory. In order to protect the structural integrity of cultural relics, retain their location information before excavation, avoid secondary damage to them, and not affect subsequent restoration work, it is essential that they should be properly and urgently protected in this period. The technique of on-site extraction of historical relics is a key component of conservation of cultural relics at archaeological sites, which is to subject the cultural relics to a proper and temporary treatment with an appropriate material, and transfer the relics and surrounding supporting soil to a laboratory for effective protection. The requirement for the material is that it should have certain reinforcement strength, could be subsequently removed, and would not cause damage to the cultural relic itself.

With the progress of archaeological excavation, many buried cultural relics are suddenly exposed to a changing environment, and the original balance is broken. When such changes exceed the bearing capacity of the cultural relics themselves, the cultural relics would suffer irreversible damage. Generally speaking, the most effective emergency protection measure is temporary consolidation of the fragile relics, so that they could be safely transferred from excavation sites to environmentally controlled laboratories, so as to prevent the relics from being damaged or destroyed. Therefore, it is necessary to rescue and protect newly unearthed cultural relics at archaeological sites.

At present, cyclododecane is the most commonly used temporary reinforcement material at archaeological sites. Cyclododecane is a translucent waxy solid at room temperature with a melting point around 61° C. It can sublime at room temperature and has good reinforcement strength when used for temporary reinforcement of fragile cultural relics at excavation sites. Since cyclododecane can sublime completely at room temperature, the existence of a liquid phase can be avoided, thus avoiding possible damage to the relics caused by surface tension on a gas-liquid interface; and there is "zero" residue after sublimation, thus making the temporary reinforcement material have no impact on subsequent permanent protection and restoration. In recent years, institutes such as Shanghai Institute of Ceramics, Chinese Academy of Sciences, have developed a new class of menthol-based temporary reinforcement materials. Both cyclododecane and menthol temporary reinforcement materials have basically similar usage processes. The material is first melted by heating before use, and then is applied to a cultural relic through a process of brushing or dripping. This material and process have several shortcomings. First, the melted material solidifies quickly, especially under a low temperature environment in the north or in winter, which limits the penetration depth of the material in the cultural relics and the quantity of the cultural relics that could be extracted; second, the material could not be applied to some temperature-sensitive cultural relics; and third, a heating device is needed at archaeological sites, which is inconvenient to use in the field.

One alternative solution is to dissolve temporary reinforcement materials such as cyclododecane or menthol in organic solvents such as alcohols, ketones, and alkanes to prepare a solution for use. However, the shortcomings of this method are very obvious: the use of organic solvents has a great challenge to the safety of excavation sites; surface tension during the volatilization of organic liquid phase may damage the cultural relics; cyclododecane or menthol may migrate back when organic solvents volatilize; and organic solvents may affect the color of the cultural relics.

SUMMARY

The purpose of the application is to provide an organic solvent-free liquid temporary reinforcement material and to apply such material to temporary reinforcement of cultural relics at archaeological excavation sites, so as to solve practical problems existing in existing temporary reinforcement materials and technology.

In the first aspect, the application provides a composition comprising a reinforcement material and a crystallization inhibitor, wherein the reinforcement material is two or more molecules selected from the group consisting of menthol, menthone, menthyl esters, and menthyl ethers, and the content of the crystallization inhibitor is less than 50 ppm.

The composition may be used to form a liquid temporary reinforcement material for temporary reinforcement of cultural relics at archaeological excavation sites.

In the second aspect, the application provides a liquid temporary reinforcement material comprising a reinforcement material and a crystallization inhibitor, wherein the reinforcement material is two or more molecules selected from the group consisting of menthol, menthone, menthyl esters, and menthyl ethers, and the content of the crystallization inhibitor is less than 50 ppm, and wherein the liquid temporary reinforcement material is liquid at room temperature.

According to the liquid temporary reinforcement material of the application, menthol and its derivatives are mixed together to form a composite material for temporary reinforcement, which is liquid at room temperature and can be controllably volatilized, is capable of meeting temporary reinforcement requirement for extracting the cultural relics at archaeological excavation sites, and is convenient to use. The liquid temporary reinforcement material provided by the present application overcomes the limitation that on-site heating and melting is needed when using a single reinforcement material such as menthol, has a lower usage temperature, retains the sublimation characteristic, could be easily removed from reinforced cultural relics with low or no residue, and has a good infiltration ability and a good reinforcement effect, and thus is an ideal novel protection material for temporary reinforcement of cultural relics.

Preferably, the menthyl esters may be one or more selected from the group consisting of menthyl carbonate and menthyl lactate, and the menthyl ethers may be one or more selected from the group consisting of menthyl methyl ether, menthyl ethyl ether, and menthyl phenyl ether.

Preferably, the crystallization inhibitor may be one or more selected from the group consisting of nonionic surfactants, anionic surfactants, polyols and polyhydroxyl polymers.

Preferably, the liquid temporary reinforcement material may not contain other organic solvents.

In the third aspect, the present application provides a preparing method of the liquid temporary reinforcement material, comprising: mixing a reinforcement material and a crystallization inhibitor, heating the mixture to melt and mixing uniformly, then keeping the mixture for cooling to room temperature to obtain the liquid temporary reinforcement material.

In the fourth aspect, the present application provides a method of temporarily reinforcing a cultural relic or remains at excavation sites, comprising the following steps:

Step 1: covering a cultural relic or remains to be reinforced with a fiber fabric and applying any one of the above-mentioned liquid temporary reinforcement materials to the fiber fabric, or directly applying any one of the above-mentioned liquid temporary reinforcement materials to the cultural relic or remains to be reinforced; and Step 2: solidifying the liquid temporary reinforcement material to temporarily reinforce the cultural relic or remains.

Preferably, the way of applying may be any one of spraying, brushing, dripping, and pouring.

Preferably, the cultural relic or remains may be a cultural relic or remains that is fragile and/or sensitive to an environment, preferably colored drawings peeled from Terracotta Warriors, stone relic fragments, rock paintings and murals, lacquer relic fragments, wood relic fragments, paper relics, or cotton and linen relics.

In the fifth aspect, the present application provides a temporarily reinforced body of a cultural relic or remains, comprising an unearthed cultural relic or remains, and a reinforcement material applied to the unearthed cultural relic or remains, wherein the reinforcement material is solidified from any one of the above-mentioned liquid temporary reinforcement materials.

According to the present application, a composite material for temporary reinforcement is provided, which is a liquid at room temperature and is controllably volatilizable, could meet temporary reinforcement requirements for extracting the cultural relics at archaeological excavation sites, and is convenient to use.

DETAILED DESCRIPTION

Figure 1:
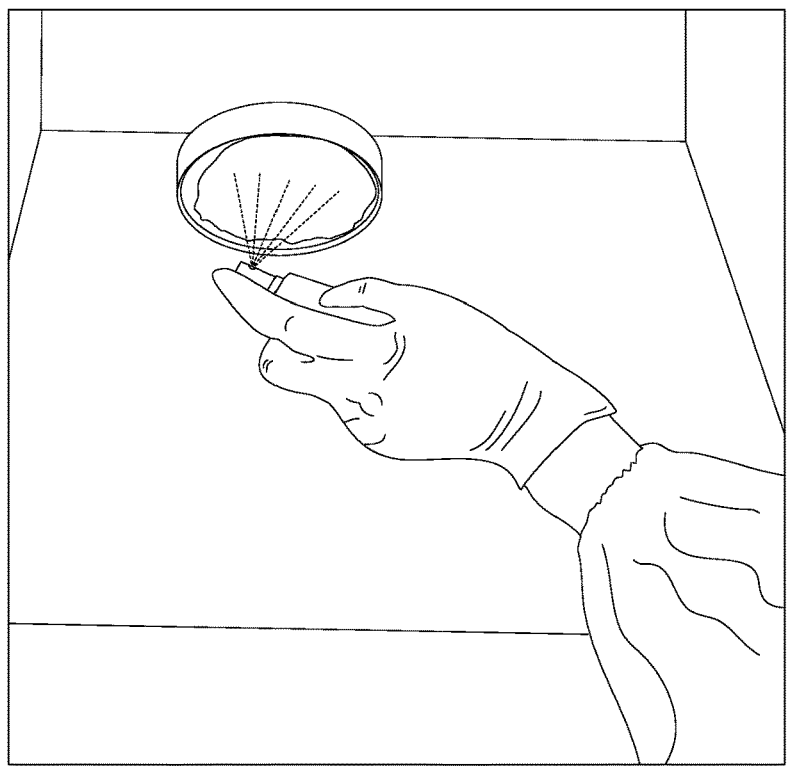
FIG. 1 is an operation example of applying a liquid temporary reinforcement material to a fiber fabric by spraying to the facade in an embodiment of the invention.

The present invention will be further described with the following embodiments below. It should be understood that the following embodiments are only used for explaining this invention, and do not limit this invention.

In an embodiment of the application, provided is a liquid temporary reinforcement material, which is a composite material that exists in a liquid form at room temperature and is controllably volatilizable, and obtained by mixing two or more molecules selected from menthol and its derivatives in a certain ratio, and adding a crystallization inhibitor of less than 50 ppm thereto.

Derivatives of menthol include but are not limited to at least one of menthone, menthyl esters, and menthyl ethers. Menthol and its derivatives could be shown in formula I as follows:

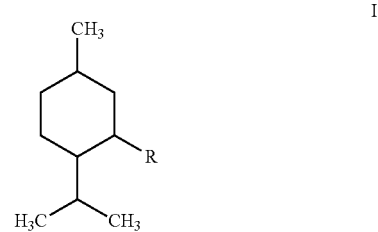

Wherein, R could be any one of hydroxyl, carbonyl, ester, alkoxy, etc.

Preferably, menthyl esters may include at least one of menthyl carbonate (i.e., R is OC(=O)OH) and menthyl lactate (i.e., R is OC(=O)CH(OH)CH$_3$).

Menthyl ethers may include at least one of menthyl methyl ether (i.e., R is OCH$_3$), menthyl ethyl ether (i.e., R is OCH$_2$CH$_3$), and menthyl phenyl ether (i.e., R is OPh).

In addition, formula I could be either a racemate or an optical isomer.

In a preferred embodiment, the liquid temporary reinforcement material contains at least menthol and/or menthyl lactate. Each component of the liquid temporary reinforcement material may be of different proportions according to different conditions. In one example, mass percentages of the components in the liquid temporary reinforcement material (excluding the crystallization inhibitor) are: menthol and/or menthyl lactate of 90 to 100%, and other derivatives of 0 to 10%. Preferably, the total mass percentage of two or more molecules selected from menthol and its derivatives and a crystallization inhibitor is 100%. In addition, the total mass percentage of components with reinforcing properties (i.e., two or more molecules selected from menthol and its derivatives) in the liquid temporary reinforcement material is preferably more than 99.995%.

The crystallization inhibitor includes but is not limited to: common non-ionic surfactants, for instance, polyoxyethylene-type nonionic surfactants such as commercial Triton series, etc., and polyols-type nonionic surfactants such as Span and Tween series, etc.; common anionic surfactants, such as polyacrylamides, etc.; and common polyols and polyhydroxyl polymers. The content of the crystallization inhibitor in the liquid temporary reinforcement material is preferably less than 50 ppm. If the content is more than 50 ppm, it will lead to residue after volatilization.

In addition, the liquid temporary reinforcement material preferably does not contain other organic solvents. Therefore, the damage to the cultural relics by surface tension during the volatilization of organic liquid phase, as well as the influence of organic solvents on the color of the cultural relics, could be avoided.

In an embodiment of the invention, the liquid temporary reinforcement material is prepared by the following method. The components of the liquid temporary reinforcement material are mixed in a target ratio, heated to melting, mixed uniformly, and then slowly cooled down to form a homogeneous liquid temporary reinforcement material. The melting temperature could be 60 to 80° C. The heating method could be water bath heating, etc. In addition, the crystallization inhibitor could be mixed with other components followed by heating to melt, or be added after other components have been heated and melted. The liquid temporary reinforcement material could be maintained as a liquid after being formed, and the minimum temperature to remain liquid state could be −10° C. There is no need to reheat or add organic solvents to dissolve the liquid temporary reinforcement material while using.

The liquid temporary reinforcement material of the present application could be used for temporary reinforcement of the cultural relics or remains, especially for temporary reinforcement of the cultural relics or remains at excavation sites.

First, a cultural relic or remains to be reinforced is covered with a fiber fabric, and a liquid temporary reinforcement material is applied to the fabric, or a liquid temporary reinforcement material is directly applied to an unearthed relic (no fiber fabric is required). The way of applying could be any one of spraying, brushing, dripping, and pouring.

The cultural relic to be reinforced may be a cultural relic that is fragile and/or sensitive to the environment, such as colored drawings peeled from Terracotta Warriors, stone relic fragments, rock paintings and murals, lacquer relic fragments, wood relic fragments, paper relics, or cotton and linen relics.

Once the liquid temporary reinforcement material is applied to the cultural relic and/or the fiber fabric, it would crystallize (solidify) within a certain period of time due to contact with a heterogeneous interface, thus realizing temporary reinforcement of the cultural relic. The crystallization solidification time may be 1 to 120 minutes. The crystallization solidification time could be adjusted by types and/or ratios of two or more molecules selected from menthol and its derivatives. Increasing the proportion difference between molecules could shorten the crystallization solidification time, while decreasing the proportion difference between molecules could make the crystallization solidification time longer. The liquid temporary reinforcement material could penetrate into a sufficient depth even in a low temperature environment.

The fiber fabric may be a natural or synthetic fiber fabric. The fiber fabric is preferably cotton gauze. The fiber fabric could be laid on or wrapped around the surface or periphery of the cultural relic to be reinforced, and the liquid temporary reinforcement material is applied to the fiber fabric, penetrating into the cultural relic to be reinforced through the fiber fabric, and forming a firm combination between the cultural relic to be reinforced and the fiber fabric, so that the fiber could bear most of the forces when the cultural relic is subjected to external forces.

In addition, the method provided by the present application could also be used to temporarily reinforce massive and large-area fragile cultural relics. For example, the area could be 5 m×5 m or more.

The liquid temporary reinforcement material has volatility (sublimability) and is easy to be removed from a reinforced body without residue. The reinforcing material could be sublimated and removed from the reinforced body by heating or spontaneous volatilization. Preferably, the removal method is spontaneous volatilization. The liquid temporary reinforcement material could also be coated with a plastic film to slow its volatilization.

When the liquid temporary reinforcement material of the present application is used for the reinforcement of the cultural relics, recommended applications include: temporary reinforcement extraction of colored drawings peeled from Terracotta Warriors; temporary reinforcement extraction of stone relic fragments; protective extraction of rock murals; temporary reinforcement extraction of lacquer relic fragments; temporary reinforcement extraction of wood relic fragments; and temporary reinforcement extraction of cotton and linen cultural relics.

The liquid temporary reinforcement material of the present application overcomes the limitations of prior temporary reinforcement materials, such as requiring on-site heating at archaeological excavation sites, difficulty in applying to a facade or a top surface (because the liquid temporary reinforcement material of the present application can be sprayed with spray bottles), and difficulty in applying to temperature-sensitive cultural relics. The liquid temporary reinforcement material of the present application has an advantage of being liquid at room temperature and controllably volatilizable, and thus could be used directly, and meets the harsh conditions of field operation. It solves the condition limitation of requiring on-site heating and melting when using existing solid temporary reinforcement materials such as cyclododecane and menthol, solves the problem that existing solid temporary reinforcement materials are difficult to be applied to the facade and the top surface and could not be used in a low temperature environment, and retains the sublimation characteristics of temporary reinforcement materials and is easy to be removed from a reinforced body without residue.

Hereinafter, the present invention will be better described with the following representative examples. It should be understood that the following examples are used to explain this invention and do not limit the scope of this invention. Any non-essential improvements and modifications made by a person skilled in the art can choose proper values within an appropriate range according to the description of this article, and are not restricted to the specific values cited below.

Example 1

A liquid temporary reinforcement material comprising menthol and menthyl lactate was applied to extraction of simulated soil samples by brushing.

(1) Preparation of a Liquid Temporary Reinforcement Material Comprising Menthol and Menthyl Lactate Menthol of 9.5 g, menthyl lactate of 0.5 g, and Triton X-100 with a content of 0.0001% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthol and menthyl lactate.

(2) Applying the Composite Material to Extraction of Simulated Soil Samples

A simulated soil sample was wrapped with gauze, and the composite material was applied to the surface of the soil sample several times with a small amount by brush painting with a brush to ensure that the material penetrated into the interior. After 30 to 60 minutes, the material solidified, and a blank part of the gauze was carefully lifted, so that the reinforced soil sample was extracted.

The mass of the simulated soil sample extracted by the above method was 35 g, and that of the temporary reinforcement material as used was 10 g. After 30 days of spontaneous volatilization, the temporary reinforcement material was completely volatilized, and GC-MS test showed that there was no residue of the temporary reinforcement material.

Example 2

A liquid temporary reinforcement material comprising menthol and methyl lactate was applied to extraction of simulated colored drawing relics by spraying.

(1) Preparation of a Liquid Temporary Reinforcement Material Comprising Menthol and Methyl Lactate Menthol of 9.0 g, methyl lactate of 1.0 g, and Triton X-100 with a content of 0.0001% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthol and methyl lactate.

(2) Applying the Composite Material to Extraction of Simulated Colored Drawing Remains A simulated colored drawing remains was wrapped with gauze, and the composite material was sprayed on the surface of the colored drawing remains several times with a small amount through a spray bottle to ensure that the material penetrated into the interior. After the material solidified, a blank part of the gauze was carefully lifted, so that the reinforced colored drawing remains were extracted.

The area of the simulated colored drawing remains extracted by the above method was 10 cm×10 cm, and the depth was 2 cm. The mass of the temporary reinforcement material as used was 10 g. After 30 days of spontaneous volatilization, the temporary reinforcement material was completely volatilized, and GC-MS test showed that there was no residue of the temporary reinforcement material.

Example 3

A liquid temporary reinforcement material comprising menthol and methyl lactate was used for the extraction of simulated murals by spraying to the top surface or facade.

(1) Preparation of a Liquid Temporary Reinforcement Material Comprising Menthol and Methyl Lactate Menthol of 1.0 g, methyl lactate of 9.0 g, and Triton X-100 with a content of 0.0001% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthol and methyl lactate.

(2) Applying the Composite Material to Extraction of Simulated Murals

Figure 2:
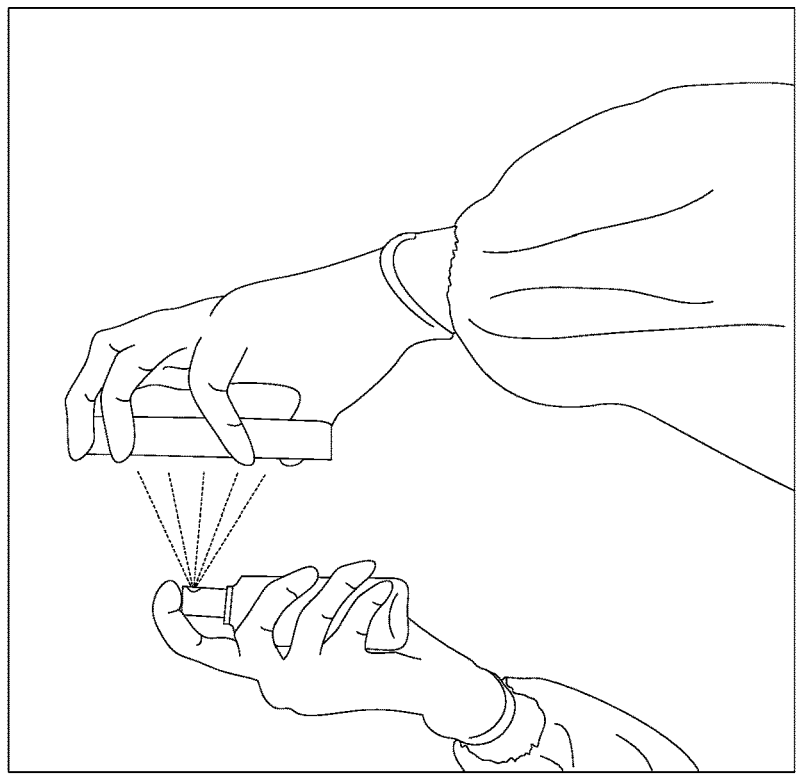
FIG. 2 is an operation example of applying a liquid temporary reinforcement material to a fiber fabric by spraying to the top surface in an embodiment of the invention.

Gauze was fixed on the surface of a simulated mural and the liquid temporary reinforcement material was sprayed onto the surface of the mural several times with a small amount through a spray bottle. The spraying manner is shown in FIG. 1 or FIG. 2. After the material solidified, a blank part of the gauze was carefully lifted, so that the reinforced mural was extracted.

The area of the simulated mural extracted by the above method was 5 cm×5 cm, and the depth was 1 cm. The mass of the temporary reinforcement material as used was 5 g. After 60 days of spontaneous volatilization, the temporary reinforcement material was completely volatilized, and GC-MS test showed that there was no residual of the temporary reinforcement material.

Example 4

A liquid temporary reinforcement material comprising menthol and methyl lactate was used for the extraction and reinforcement of simulated soil samples at 0° C.

(1) Preparation of a Liquid Temporary Reinforcement Material Comprising Menthol and Methyl Lactate Menthol of 2 g, methyl lactate of 8 g, and Tween-80 with a content of 0.0003% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthol and methyl lactate.

(2) Applying the Composite Material to Extraction of Simulated Soil Samples

A simulated soil sample (0° C.) was wrapped with gauze, and the composite material was brushed or sprayed onto the surface of the simulated soil sample several times with a small amount to ensure that the material penetrated into the interior. After 30 to 60 minutes, the material solidified, and a blank part of the gauze was carefully lifted, so that the reinforced soil sample was extracted.

The mass of the simulated soil sample extracted by the above method was 30 g, and that of the reinforcement material as used was 10 g. After 60 days of spontaneous volatilization, the temporary reinforcement material was completely volatilized, and GC-MS test showed that there was no residue of the temporary reinforcement material.

Example 5

A liquid temporary reinforcement material comprising menthol and menthyl methyl ether was used to extract and reinforce simulated textiles.

(1) Preparation of a Liquid Temporary Reinforcement Material Comprising Menthol and Menthyl Methyl Ether Menthol of 4.75 g, menthyl methyl ether of 0.25 g, and Triton X-100 with a content of 0.0001% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthol and menthyl methyl ether.

(2) Applying the Liquid Temporary Reinforcement Material Comprising Menthol and Menthyl Methyl Ether to Extraction and Reinforcement of Simulated Textiles A textile to be extracted was coated with the above-mentioned material by brushing with a brush or spraying with a spray bottle several times with a small amount, covered with gauzes, and then coated with the liquid temporary reinforcement material by brushing again. An extraction layer and a lower layer of the textile were separated with a shovel, and an upper layer of the textile was lifted and transferred as a whole.

The area of the simulated textile extracted by the above method was 5 cm×5 cm, and the depth was 0.5 cm. The mass of the temporary reinforcement material as used was 5 g. After 30 days of spontaneous volatilization, the temporary reinforcement material was completely volatilized, and GC-MS test showed that there was no residue of the temporary reinforcement material.

Example 6

A liquid temporary reinforcement material comprising menthyl lactate and menthone was used for extraction and reinforcement of simulated soil samples.

(1) Preparation of a Liquid Temporary Reinforcement Material Comprising Menthyl Lactate and Menthone Menthyl lactate of 9.5 g, menthone of 0.5 g, and Tween-80 with a content of 0.0003% by mass were weighed respectively, placed in a 100 mL beaker, and heated and stirred in a water bath at 80° C. for melting to form a homogeneous solution system. Then the solution system was kept for cooling to give a liquid temporary reinforcement material comprising menthyl lactate and menthone.

(2) Applying the Liquid Temporary Reinforcement Material Comprising Menthyl Lactate and Menthone to Extraction and Reinforcement of Simulated Soil Samples A simulated soil sample was wrapped with gauze, and the composite material was brushed onto the surface of the simulated soil sample through a brush several times with a small amount to ensure that the material penetrated into the interior. After 30 to 60 minutes, the material solidified, and a blank part of the gauze was carefully lifted, so that the reinforced soil sample was extracted.

The mass of the simulated soil sample extracted by the above method was 30 g, and that of the temporary solid material as used was 10 g. After 60 days of spontaneous volatilization, the temporary solid material was completely volatilized, and GC-MS test showed that there was no residue of the temporary reinforcement material.

The invention claimed is:

1. A liquid temporary reinforcement material, comprising a reinforcement material and a crystallization inhibitor, wherein
the reinforcement material is two or more molecules selected from the group consisting of menthol, menthone, menthyl esters, and menthyl ethers, and the content of the crystallization inhibitor is less than 50 ppm, and
the crystallization inhibitor is one or more selected from the group consisting of nonionic surfactants, anionic surfactants, polyols, and polyhydroxylated polymers.

2. A liquid temporary reinforcement material, comprising a reinforcement material and a crystallization inhibitor, wherein
the reinforcement material is two or more molecules selected from the group consisting of menthol, menthone, menthyl esters, and menthyl ethers, and the content of the crystallization inhibitor is less than 50 ppm,
the liquid temporary reinforcement material is liquid at room temperature, and
the crystallization inhibitor is one or more selected from the group consisting of nonionic surfactants, anionic surfactants, polyols, and polyhydroxylated polymers.

3. The liquid temporary reinforcement material of claim 1, wherein the menthyl esters are one or more selected from the group consisting of menthyl carbonate and menthyl lactate, and the menthyl ethers are one or more selected from the group consisting of menthyl methyl ether, menthyl ethyl ether, and menthyl phenyl ether.

4. The liquid temporary reinforcement material of claim 1, wherein the liquid temporary reinforcement material does not contain other organic solvents.

5. A preparing method of the liquid temporary reinforcement material of claim 2, comprising: mixing a reinforcement material and a crystallization inhibitor, heating the mixture to melt and mixing uniformly, then keeping the mixture for cooling to room temperature to obtain the liquid temporary reinforcement material.

6. A method of temporarily reinforcing a cultural relic or remains, comprising the following steps:
Step 1: covering a cultural relic or remains to be reinforced with a fiber fabric and applying a liquid temporary reinforcement material to the fiber fabric, or directly applying the liquid temporary reinforcement material to a cultural relic or remains to be reinforced, wherein the liquid temporary reinforcement material comprises a reinforcement material and a crystallization inhibitor, the reinforcement material is two or more molecules selected from the group consisting of menthol, menthone, menthyl esters, and menthyl ethers, and the content of the crystallization inhibitor is less than 50 ppm, and the crystallization inhibitor is one or more selected from the group consisting of nonionic surfactants, anionic surfactants, polyols, and polyhydroxylated polymers; and
Step 2: solidifying the liquid temporary reinforcement material to temporarily reinforce the cultural relic or remains.

7. The method of claim 6, wherein the way of applying is any one of spraying, brushing, dripping, and pouring.

8. The method of claim 6, wherein the cultural relic or remains is fragile and/or sensitive to an environment.

9. A temporarily reinforced body of a cultural relic or remains, comprising an unearthed cultural relic or remains, and a reinforcement material applied to the unearthed cultural relic or remains, wherein the reinforcement material is solidified from the liquid temporary reinforcement material of claim 2.

10. The method of claim 8, wherein the cultural relic or remains is colored drawings peeled from Terracotta Warriors, stone relic fragments, rock paintings and murals, lacquer relic fragments, wood relic fragments, paper relics, or cotton and linen relics.

* * * * *